US012610433B2

(12) United States Patent
Aizawa

(10) Patent No.: US 12,610,433 B2
(45) Date of Patent: Apr. 21, 2026

(54) DIELECTRIC HEATING DEVICE

(71) Applicant: SEIKO EPSON CORPORATION, Tokyo (JP)

(72) Inventor: Tadashi Aizawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 614 days.

(21) Appl. No.: 18/107,297

(22) Filed: Feb. 8, 2023

(65) Prior Publication Data

US 2023/0254949 A1 Aug. 10, 2023

(30) Foreign Application Priority Data

Feb. 9, 2022 (JP) ................................ 2022-018662

(51) Int. Cl.
*H05B 6/48* (2006.01)
*B41J 11/00* (2006.01)

(52) U.S. Cl.
CPC .......... *H05B 6/48* (2013.01); *B41J 11/00218* (2021.01)

(58) Field of Classification Search
CPC .................................. H05B 6/46; H05B 6/48
See application file for complete search history.

(56) References Cited

U.S. PATENT DOCUMENTS 1,653,951 A * 12/1927 Featherstone ........... H01F 17/02 336/107
2,511,230 A * 6/1950 Wald ....................... H01F 17/04 336/67
5,099,756 A * 3/1992 Franconi ................ A61N 2/002 219/676
7,513,031 B2 * 4/2009 Pleskach ............... H01F 41/046 336/200
11,012,068 B2 * 5/2021 Sawada .................. G01V 3/088
2020/0406636 A1 12/2020 Aizawa
2021/0233690 A1 * 7/2021 Kojima ..................... H01F 3/08
2023/0241904 A1 * 8/2023 Aizawa .............. B41J 11/00216 347/102

FOREIGN PATENT DOCUMENTS

JP 2004311281 A * 11/2004 ............... H05B 6/48
JP 2005-019193 A 1/2005
JP 2006-147821 A 6/2006
JP 2021-008055 A 1/2021

* cited by examiner

*Primary Examiner* — Lorne E Meade
(74) *Attorney, Agent, or Firm* — Harness, Dickey & Pierce, P.L.C.

(57) ABSTRACT

A dielectric heating device includes a first electrode and a second electrode that face an object to be heated and to which an AC voltage is applied, and a coil that is electrically coupled in series to the first electrode. A linear distance between one end and the other end of the coil is equal to or smaller than a linear distance between the one end and a central portion of the coil in a magnetic path direction of the coil.

7 Claims, 9 Drawing Sheets

DIELECTRIC HEATING DEVICE

The present application is based on, and claims priority from JP Application Serial Number 2022-018662, filed Feb. 9, 2022, the disclosure of which is hereby incorporated by reference herein in its entirety.

BACKGROUND

1. Technical Field

The present disclosure relates to a dielectric heating device.

2. Related Art

JP-A-2021-8055 discloses a dielectric heating device provided with an electromagnetic wave generation unit including a first electrode, a second electrode, and a coil electrically coupled to the first electrode. The dielectric heating device generates an electric field between the first electrode and the second electrode by applying a high-frequency voltage to the first electrode and the second electrode, and heats and dries ink adhering to a recording medium by dielectric heating of the generated electric field. The coil serves to adjust a resonance frequency of the electromagnetic wave generation unit, implement impedance matching, enhance the electric field generated between the electrodes, and the like.

In JP-A-2021-8055, it may be desired to increase an inductance of the coil for a purpose of adjusting the resonance frequency of the electromagnetic wave generation unit. In this case, the inductance of the coil can be easily increased by increasing the number of windings and a cross-sectional area of the coil. However, an increase in the number of windings or the cross-sectional area of the coil may increase a size of the coil and a range of an unnecessary electromagnetic field generated from the coil when the voltage is applied. When an output of electric power output to the electromagnetic wave generation unit is reduced in order to prevent such an unnecessary electromagnetic field, heating efficiency of an object to be heated may decrease.

SUMMARY

According to an aspect of the present disclosure, a dielectric heating device is provided. The dielectric heating device includes a first electrode and a second electrode that face an object to be heated and to which an AC voltage is applied, and a coil that is electrically coupled in series to the first electrode. A linear distance between one end and the other end of the coil is equal to or smaller than a linear distance between the one end and a central portion of the coil in a magnetic path direction of the coil.

DESCRIPTION OF EXEMPLARY EMBODIMENTS

A. First Embodiment

Figure 1:
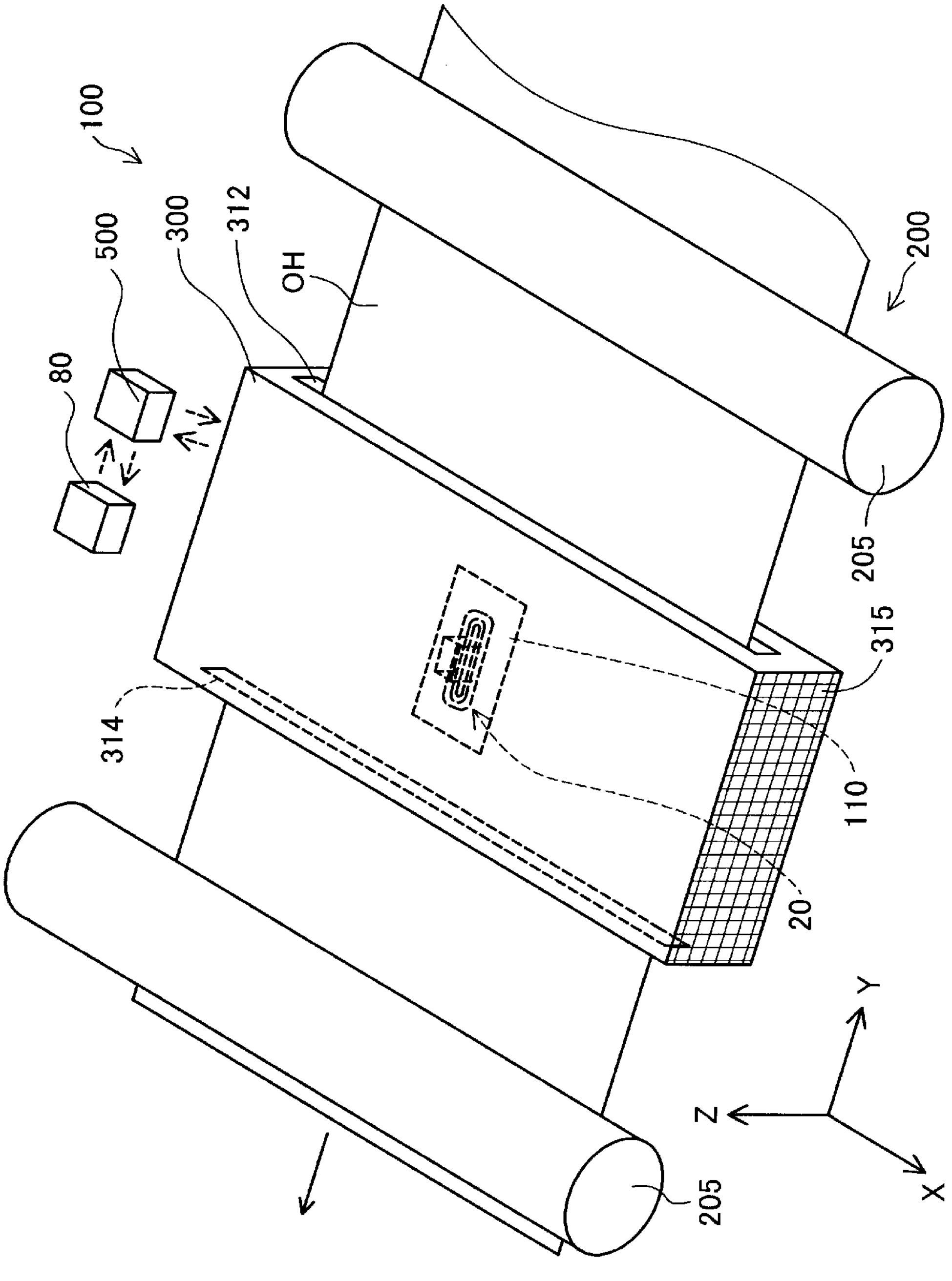
FIG. 1 is a perspective view showing a schematic configuration of a dielectric heating device according to a first embodiment.

FIG. 1 is a perspective view showing a schematic configuration of a dielectric heating device 100 according to a first embodiment. FIG. 1 shows arrows indicating X, Y, and Z directions orthogonal to each other. The X direction and the Y direction are directions parallel to a horizontal plane, and the Z direction is a direction along a vertically upward direction. The arrows indicating the X, Y, and Z directions are also shown in other drawings as appropriate such that the directions shown in the drawings correspond to those in FIG. 1. In the following description, when a direction is specified, the direction indicated by the arrow in each drawing is referred to as "+", a direction opposite thereto is referred to as "−", and both positive and negative signs are used for direction notation. Hereinafter, a +Z direction is also referred to as "upper", and a −Z direction is also referred to as "lower". In the present specification, orthogonal refers to a range of 90°±10°.

The dielectric heating device 100 includes an electrode unit 20 that heats an object OH to be heated, a voltage application unit 80 that applies an AC voltage to the electrode unit 20, and a control unit 500. The dielectric heating device 100 according to the present embodiment further includes a conveyance unit 200 that conveys the object OH to be heated, and a case portion 300 that accommodates the electrode unit 20.

The dielectric heating device 100 according to the present embodiment heats, in the case portion 300, the object OH to be heated by an electric field generated from the electrode unit 20 while conveying the object OH to be heated by the conveyance unit 200. In the present embodiment, the dielectric heating device 100 dries the object OH to be heated by heating, as the object OH to be heated, a sheet-shaped printing medium to which a liquid is applied. For example, paper, cloth, film, or the like is used as the printing medium. For example, various inks each containing water or an organic solvent as a main component are used as the liquid to be applied to the printing medium. The liquid is applied to the printing medium by a liquid ejection device such as an inkjet printer.

The control unit 500 is implemented by a computer including a CPU, a storage unit, and an input and output interface that receives signals from the outside and outputs signals to the outside. The control unit 500 heats the object OH to be heated in the dielectric heating device 100 by controlling units such as the conveyance unit 200 and the voltage application unit 80 described above. In other embodiments, the control unit 500 may be implemented by a combination of a plurality of circuits, for example.

The conveyance unit 200 according to the present embodiment includes two rollers 205 and a driving unit (not shown) implemented by a motor or the like for driving the rollers 205. The conveyance unit 200 conveys the sheet-shaped object OH to be heated by driving the rollers 205. In other embodiments, the conveyance unit 200 may include, for example, a belt that conveys the object OH to be heated while supporting the object OH to be heated, and a driving unit that drives the belt.

The case portion 300 is made of a metal material and blocks a radiation wave from the electrode unit 20 accommodated therein. More specifically, the case portion 300 blocks the radiation wave by generating, from the case portion 300, an electromagnetic field that weakens the radiation wave, by an eddy current generated on a wall surface of the case portion 300 when the radiation wave is radiated from the electrode unit 20. The case portion 300 "blocks the radiation wave" means that an intensity of the electromagnetic field radiated from the electrode unit 20 to the outside of the case portion 300 is reduced to a predetermined reference value or less by the case portion 300. The reference value is determined based on a regulation value defined in a guideline or the like related to exposure limitation of an electromagnetic field in each country or region.

The case portion 300 according to the present embodiment is made of zinc and has a rectangular parallelepiped outer shape. Each surface of the case portion 300 is formed of a wire mesh obtained by plain-weaving zinc wires vertically and horizontally, and has a plurality of openings 315 partitioned by the wires. In FIG. 1, among the openings 315, only the opening 315 provided in a surface of the case portion 300 on a +X direction side is shown, and the openings 315 provided in other surfaces are omitted. In other embodiments, each surface of the case portion 300 may be formed of a wire mesh obtained by twill-weaving wires, expanded metal, punched metal, or the like. In addition, the case portion 300 may be made of carbon steel, aluminum, or the like.

The object OH to be heated is inserted into the case portion 300 through an insertion port 312 provided in a surface of the case portion 300 on a +Y direction side while being conveyed by the conveyance unit 200. Then, the object OH to be heated is heated by the electrode unit 20 in the case portion 300 while being conveyed in the same manner, and is then delivered out to the outside of the case portion 300 through a delivery port 314 provided in a surface of the case portion 300 on a −Y direction side.

Figure 2:
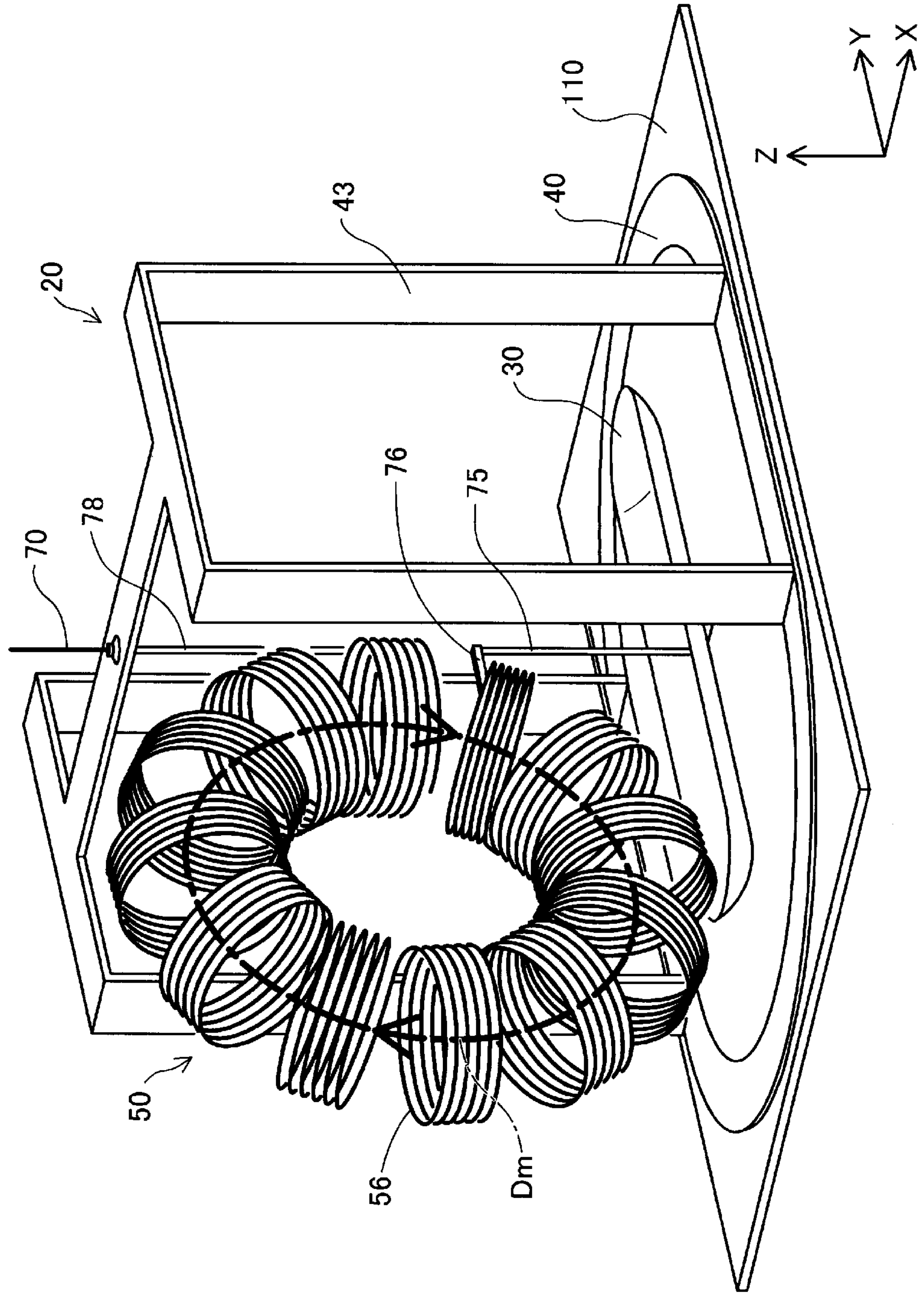
FIG. 2 is a perspective view showing a schematic configuration of an electrode unit according to the first embodiment.
Figure 3:
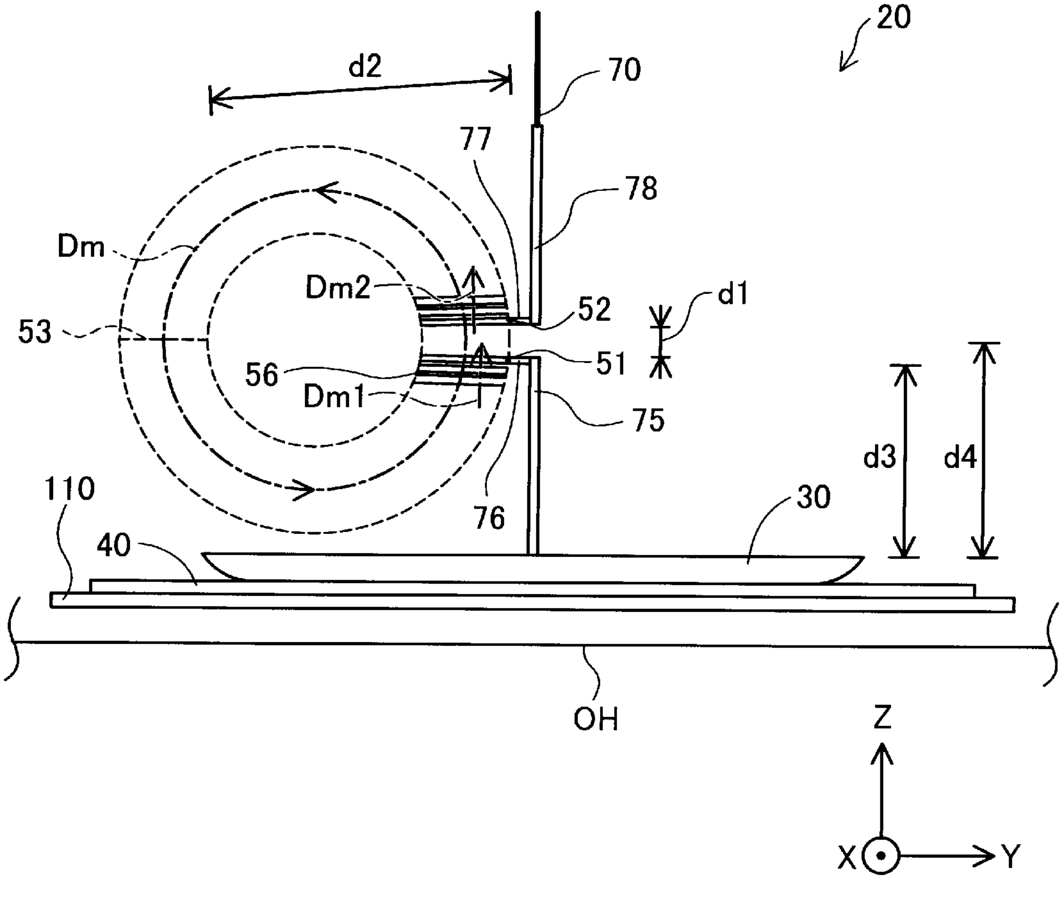
FIG. 3 is a front view of the electrode unit according to the first embodiment.

FIG. 2 is a perspective view showing a schematic configuration of the electrode unit 20 according to the present embodiment. FIG. 3 is a front view of the electrode unit 20 according to the present embodiment. The electrode unit 20 includes a first electrode 30, a second electrode 40, and a coil 50 electrically coupled in series to the first electrode 30.

The first electrode 30 and the second electrode 40 are both electrically coupled to the voltage application unit 80 shown in FIG. 1. In the present embodiment, the first electrode 30 is electrically coupled to the voltage application unit 80 via a first electric wire 75, a first coupling portion 76, the coil 50, a second coupling portion 77, a second electric wire 78, and an internal conductor 70 of a coaxial cable. The second electrode 40 is electrically coupled to the voltage application unit 80 via a coupling member 43 disposed above the second electrode 40, an external conductor of a coaxial cable (not shown), or the like. In FIG. 3, the coupling member 43 is omitted.

The first electrode 30 and the second electrode 40 are conductors, and are each made of a metal, an alloy, a conductive oxide, or the like. The first electrode 30 and the second electrode 40 may be made of the same material or different materials. For example, the first electrode 30 and the second electrode 40 may be disposed on a substrate or the like made of a material having a low dielectric loss tangent or low conductivity for a purpose of maintaining a posture and intensity thereof, or may be supported by other members.

As shown in FIG. 2, the first electrode 30 according to the present embodiment has a boat shape with the Y direction as a longitudinal direction and the X direction as a lateral direction. A lower surface of the first electrode 30 has a curved surface shape convex in the −Z direction. The first electrode 30 has an oval shape elongated in the Y direction when viewed along the Z direction. The first electrode 30 has an arc shape convex in the −Z direction when viewed along the X direction. The first electrode 30 has an arc shape convex in the −Z direction when viewed along the Y direction. Therefore, end portions of the first electrode 30 in the longitudinal direction and end portions of the first electrode 30 in the lateral direction are located in the +Z direction with respect to a central portion of the first electrode 30.

The second electrode 40 has an oval annular shape that is flat in the X direction and the Y direction and elongated in the Y direction. The second electrode 40 surrounds a periphery of the first electrode 30 when viewed along the Z direction. That is, in the present embodiment, the first electrode 30 is disposed within a ring of the second electrode 40 when viewed along the Z direction. Accordingly, the electrode unit 20 according to the present embodiment has a point-symmetrical shape with respect to a central point of the first electrode 30 in the X direction and the Y direction when viewed along the Z direction.

The first electrode 30 and the second electrode 40 are both disposed on a substrate 110 parallel to the X direction and the Y direction. More specifically, the first electrode 30 is disposed such that a central portion of the lower surface of the first electrode 30 in the X direction and the Y direction is in contact with an upper surface of the substrate 110. The second electrode 40 is disposed such that a lower surface of the second electrode 40 is in contact with the upper surface of the substrate 110. Therefore, in the present embodiment, the central portion of the lower surface of the first electrode 30 and the lower surface of the second electrode 40 are disposed on the same plane.

In the present embodiment, the substrate 110 is made of glass. The substrate 110 prevents the liquid such as ink applied to the object OH to be heated from adhering to the first electrode 30 and the second electrode 40, and prevents fluff of the object OH to be heated from adhering to the first electrode 30 and the second electrode 40 when the object OH to be heated is cloth. In other embodiments, the substrate 110 may be made of alumina, for example.

An AC voltage is applied to the first electrode 30 and the second electrode 40 by the voltage application unit 80 shown in FIG. 1. The voltage application unit 80 according to the present embodiment serves as a high-frequency power supply including a high-frequency voltage generation circuit, and outputs a high-frequency voltage. The voltage application unit 80 includes, for example, a crystal oscillator, a phase locked loop (PLL) circuit, and a power amplifier. The voltage application unit 80 amplifies a high-frequency signal generated in the PLL circuit by a power amplifier, and supplies power to the electrode unit 20 via a coaxial cable or the like, thereby applying a high-frequency voltage to the first electrode 30 and the second electrode 40. One of potentials applied to the first electrode 30 and the second electrode 40 may be a reference potential. The reference potential is a constant potential serving as a reference of the high-frequency voltage, and is a ground potential, for example. In the present specification, the high-frequency voltage refers to an AC voltage having a frequency of 1 MHz or more.

When the AC voltage is applied to the first electrode 30 and the second electrode 40, an electromagnetic field having a wavelength $\lambda_0$ corresponding to a frequency $f_0$ of the applied AC voltage is generated from the first electrode 30 and the second electrode 40. An intensity of the electromagnetic field is fairly strong in the vicinity of the first electrode 30 and the second electrode 40, and is fairly weak far away. In the present specification, the electromagnetic field generated in the vicinity of the first electrode 30 and the second electrode 40 by the application of the AC voltage is also referred to as a "vicinity electromagnetic field". The "vicinity" of the first electrode 30 and the second electrode 40 refers to a range where a distance from the first electrode 30 and the second electrode 40 is equal to or smaller than $1/2\pi$ of the wavelength of the generated electromagnetic field. A range farther than the "vicinity" is also referred to as "far". In the present specification, the electromagnetic field generated far from the first electrode 30 and the second electrode 40 by the application of the AC voltage is also referred to as a "far electromagnetic field". The far electromagnetic field corresponds to an electromagnetic field used for communication by a general communication antenna or the like.

The electromagnetic field generated from the electrode unit 20 has the wavelength $\lambda_0$ corresponding to the frequency $f_0$ of the AC voltage applied to the electrode unit 20. Therefore, for example, when the object OH to be heated contains water, a dielectric loss tangent of water reaches a maximum around 20 GHz, and thus the object OH to be heated can be more efficiently heated in the dielectric heating device 100 by applying a high-frequency voltage of 2.45 GHz or 5.8 GHz in ISM bands to the electrode unit 20. From a viewpoint of heating the ink, good heating efficiency can be obtained even when the frequency $f_0$ is a low frequency such as 40.68 MHz, which is one of the ISM bands. This is because, at 40.68 MHz, the dielectric loss tangent of water in the ink is low, but Joule heat, which causes pigment components in the ink to be an electrical resistance, is likely to be generated.

The frequency $f_0$ of the electromagnetic field generated from the electrode unit 20, that is, a resonance frequency of the electrode unit 20 is determined based on a capacitance and an inductance of the electrode unit 20. For example, when a distance to the first electrode 30 and the second electrode 40 is increased in the range of "vicinity" in order to increase a heating range of the object OH to be heated by the electrode unit 20, a capacitance when the first electrode 30 and the second electrode 40 are regarded as electrode plates constituting one capacitor decreases, and thus the capacitance of the electrode unit 20 decreases. Accordingly, the resonance frequency of the electrode unit 20 increases. Therefore, for example, in order to maintain the resonance frequency of the electrode unit 20 even when the distance to the first electrode 30 and the second electrode 40 is increased, it is necessary to decrease the resonance frequency by increasing an inductance of the coil 50 to increase the inductance of the electrode unit 20.

In the present embodiment, the first electrode 30 and the second electrode 40 are disposed such that a smallest distance to the first electrode 30 and the second electrode 40 is equal to or smaller than one-tenth of the wavelength $\lambda_0$ of the electromagnetic field. Accordingly, an electric field density of the electromagnetic field generated from the first electrode 30 and the second electrode 40 can be attenuated in the vicinity of the first electrode 30 and the second electrode 40. Therefore, by appropriately maintaining the distance between the object OH to be heated, and the first electrode 30 and the second electrode 40, it is possible to prevent radiation of the far electromagnetic field from the first electrode 30 and the second electrode 40 while efficiently heating the object OH to be heated by the electric field generated in the vicinity of the first electrode 30 and the second electrode 40. In particular, in the present embodiment, since the second electrode 40 surrounds the first electrode 30 when viewed along the Z direction, the radiation of the far electromagnetic field from the first electrode 30 and the second electrode 40 can be further prevented. As long as the second electrode 40 surrounds the first electrode 30 when viewed along the Z direction, the radiation of the far electromagnetic field from the first electrode 30 and the second electrode 40 can be prevented, for example, even when an outer shape of each of the first electrode 30 and the second electrode 40 when viewed along the Z direction is a circular shape, or a polygonal shape such as a rectangular shape.

In the present embodiment, as described above, since the electrode unit 20 has the point-symmetrical shape with respect to the central point of the first electrode 30 in the X direction and the Y direction when viewed along the Z direction, the radiation of the far electromagnetic field from the first electrode 30 and the second electrode 40 can be further prevented.

As shown in FIG. 3, in the present embodiment, one end 51 of the coil 50 is electrically coupled in series to the first electrode 30 via the first coupling portion 76 and the first electric wire 75, and the other end 52 is electrically coupled in series to the voltage application unit 80 via the second coupling portion 77 and the second electric wire 78. When the voltage application unit 80 applies the AC voltage to the electrode unit 20, a high voltage is generated at the one end 51 of the coil 50. Accordingly, an intensity of the electric field generated from the first electrode 30 and the second electrode 40 can be increased. Since a Q value of the coil 50 is increased by increasing the inductance of the coil 50, it is possible to further increase the intensity of the electric field generated from the first electrode 30 and the second electrode 40. The Q value is also referred to as a quality factor.

As shown in FIG. 3, a linear distance d1 between the one end 51 and the other end 52 of the coil 50 is equal to or smaller than a smallest linear distance d2 between a central portion 53 and the one end 51. The central portion 53 refers to a central portion of the coil 50 in a magnetic path direction Dm of the coil 50. A distance in the magnetic path direction Dm from an end portion of the coil 50 on one end 51 side to the central portion 53 is equal to a distance in the magnetic path direction Dm from an end portion of the coil 50 on the other end 52 side to the central portion 53. The magnetic path direction Dm refers to a direction of a magnetic path formed in the coil 50 by energization of the coil 50. The magnetic path direction Dm is reversed according to a sign of the voltage applied to the coil 50. When the linear distance d1 is equal to or smaller than the linear distance d2, the one end 51 and the other end 52 are closer to each other than when the linear distance d1 is larger than the linear distance d2. Therefore, when the AC voltage is applied to the coil 50, an electromagnetic field radiated from the one end 51 side of the coil 50 is easily guided to the other end 52 side of the coil 50, and an electromagnetic field radiated from the other end 52 side is easily guided to the one end 51 side.

In the coil 50, in a case where the linear distance d1 is larger than the linear distance d2, when the inductance of the coil 50 is increased so as to adjust the resonance frequency of the electrode unit 20 described above, and to enhance the electric field generated from the first electrode 30 and the second electrode 40, and the like, an intensity of an unnecessary electromagnetic field generated from the coil 50 when the voltage is applied may be increased. When the number of windings or a cross-sectional area of the coil 50 is increased in order to increase the inductance of the coil 50, the coil 50 is increased in size, which may increase a range of the unnecessary electromagnetic field generated from the coil 50 when the voltage is applied. As a method of preventing such an unnecessary electromagnetic field, for example, it is conceivable to reduce an output of AC power to the first electrode 30 and the second electrode 40. However, when the output of the AC power is reduced, heating efficiency of the object OH to be heated is lowered, and thus, for example, it may take a long time to heat and dry the object OH to be heated. In the present embodiment, since the linear distance d1 is equal to or smaller than the linear distance d2 as described above, even when the inductance of the coil 50 is increased, it is possible to prevent the unnecessary electromagnetic field generated from the coil 50 without reducing the output of the AC power.

The cross-sectional area and the number of windings of the coil 50 are preferably determined in consideration of, for example, a viewpoint of implementing impedance matching between the electrode unit 20 and the voltage application unit 80, in addition to, for example, a viewpoint of adjusting the resonance frequency and enhancing the electric field described above. A magnetic path length, a material, and the like of the coil 50 are preferably selected from the same viewpoints.

In the present embodiment, as shown in FIGS. 2 and 3, the coil 50 is formed in an annular shape as a whole such that an annular magnetic path is formed in the coil 50 when viewed along the X direction. More specifically, windings 56 of the coil 50 are formed in a spiral shape advancing along a circumference. Accordingly, the coil 50 is formed in the annular shape as a whole such that the annular magnetic path is formed in the coil 50 when viewed along the X direction. A cross section of the coil 50 orthogonal to the magnetic path direction Dm has a circular shape. The shape of the coil 50 according to the present embodiment is also referred to as a donut shape, a toroidal shape, or a torus shape. In FIGS. 2 and 3, a part of the windings 56 of the coil 50 is omitted, but actually, the windings 56 are spirally wound such that intervals therebetween in the magnetic path direction Dm are substantially constant.

In the present embodiment, a linear distance d3 between the first electrode 30 and the one end 51 of the coil 50 shown in FIG. 3 is equal to or smaller than a linear distance d4 between the first electrode 30 and the central portion 53. Accordingly, a distance between the one end 51 of the coil 50 and the first electrode 30 is smaller than that when the linear distance d3 is larger than the linear distance d4, and thus it is possible to prevent generation of an electromagnetic field, which does not contribute to heating of the object OH to be heated, between the coil 50 and the first electrode 30 or between the first electric wire 75 or the first coupling portion 76 and the second electrode 40. Further, this makes it possible to effectively increase the intensity of the electric field generated from the first electrode 30 and the second electrode 40.

According to the dielectric heating device 100 according to the first embodiment described above, the linear distance d1 between the one end 51 and the other end 52 of the coil 50 is equal to or smaller than the linear distance d2 between the central portion 53 and the one end 51 of the coil 50. Accordingly, when the AC voltage is applied, the electromagnetic field radiated from the one end 51 side of the coil 50 is easily guided to the other end 52 side of the coil 50, and the electromagnetic field radiated from the other end 52 side of the coil 50 is easily guided to the one end 51 side of the coil 50. Therefore, even when the coil 50 is increased in size due to an increase in the number of windings or the cross-sectional area of the coil 50, the unnecessary electromagnetic field generated from the coil 50 can be prevented. Therefore, since it is not necessary to reduce the output of the electric power output to the first electrode 30 and the second electrode 40 in order to prevent the unnecessary electromagnetic field generated from the coil 50, it is possible to prevent a decrease in the heating efficiency of the object OH to be heated.

According to the present embodiment, the coil 50 is formed in the annular shape such that the annular magnetic path is formed in the coil 50. Therefore, it is possible to more effectively prevent the unnecessary electromagnetic field generated from the coil 50.

According to the present embodiment, the linear distance d3 between the first electrode 30 and the one end 51 of the coil 50 is equal to or smaller than the linear distance d4 between the first electrode 30 and the central portion 53. Accordingly, the distance between the one end 51 of the coil 50 and the first electrode 30 is smaller than that when the linear distance d3 is larger than the linear distance d4. Therefore, it is possible to prevent the generation of the unnecessary electromagnetic field, which does not contribute to the heating of the object OH to be heated, between the first electrode 30 and the coil 50. Accordingly, the intensity of the electric field generated from the first electrode 30 and the second electrode 40 can be effectively increased by the coil 50.

B. Second Embodiment

Figure 4:
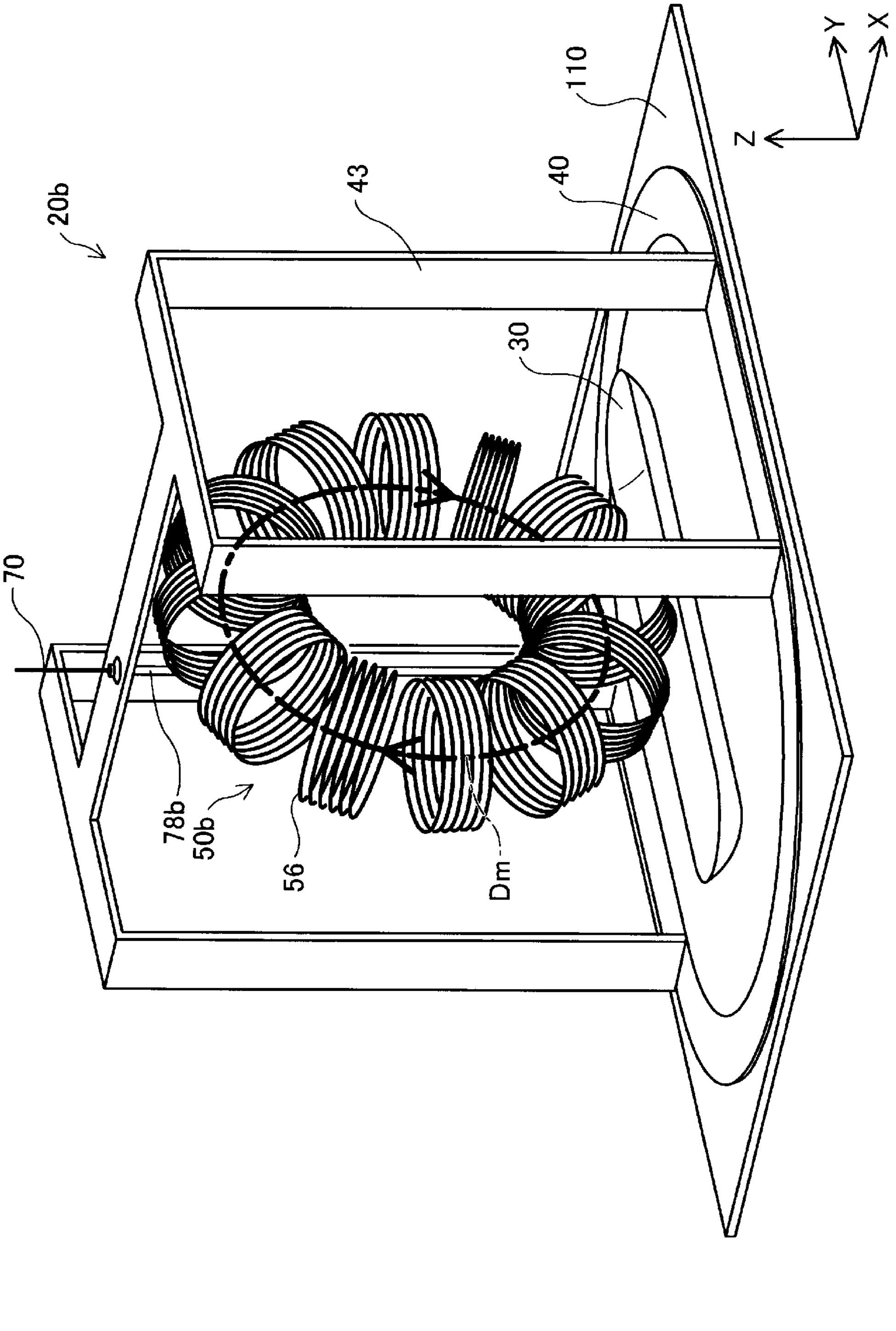
FIG. 4 is a perspective view showing a schematic configuration of an electrode unit according to a second embodiment.
Figure 5:
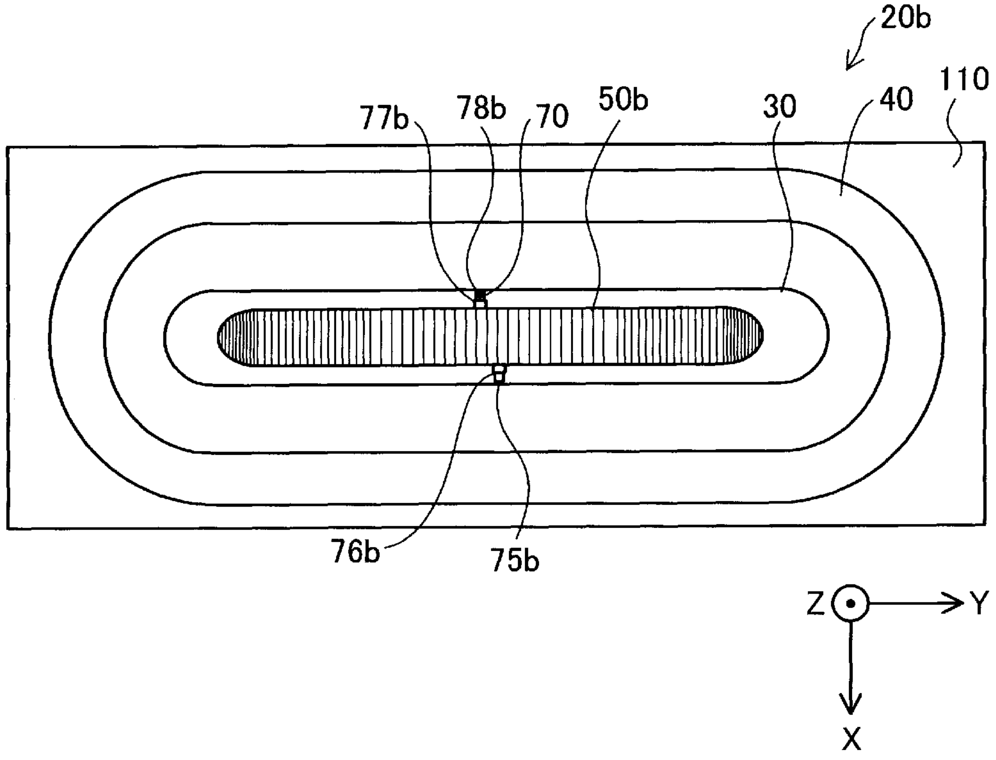
FIG. 5 is a top view of the electrode unit according to the second embodiment.
Figure 6:
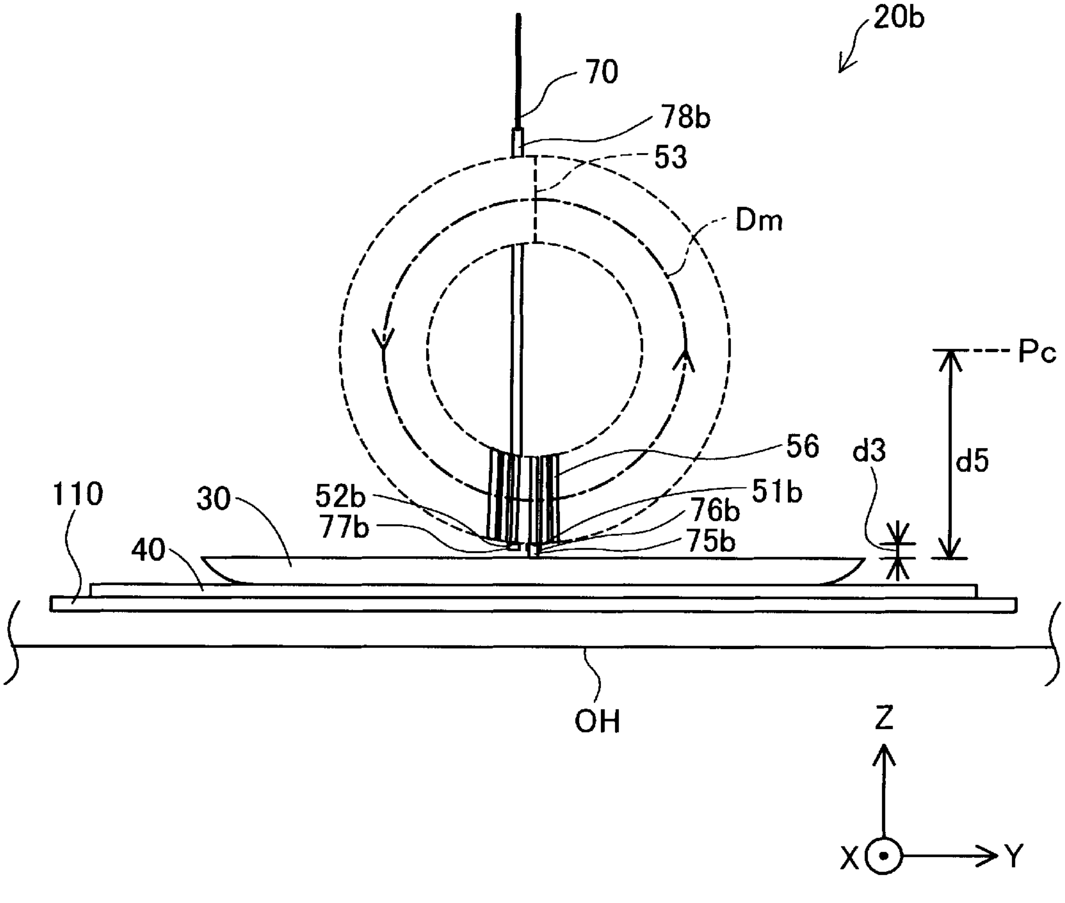
FIG. 6 is a front view of the electrode unit according to the second embodiment.
Figure 7:
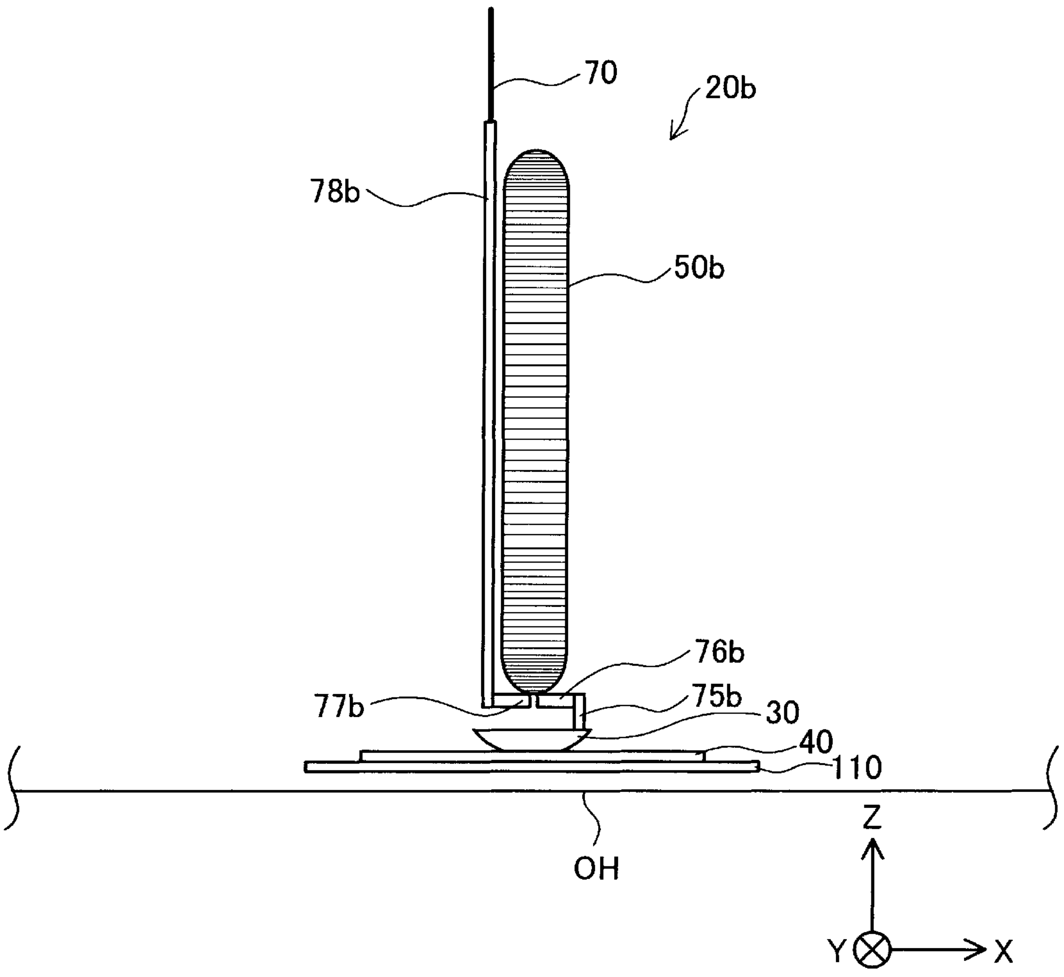
FIG. 7 is a side view of the electrode unit according to the second embodiment.

FIG. 4 is a perspective view showing a schematic configuration of an electrode unit 20*b* according to a second embodiment. FIG. 5 is a top view of the electrode unit 20*b* according to the second embodiment. FIG. 6 is a front view of the electrode unit 20*b* according to the second embodiment. FIG. 7 is a side view of the electrode unit 20*b* according to the second embodiment. In FIGS. 5 to 7, the coupling member 43 is omitted. In FIGS. 4 and 6, a part of the windings 56 is omitted as in FIGS. 2 and 3 described in the first embodiment. In the present embodiment, different from the first embodiment, a coil 50*b* is entirely disposed above the first electrode 30. In configurations of the electrode unit 20*b* and the dielectric heating device 100 according to the second embodiment, portions not particularly described are the same as those according to the first embodiment.

As shown in FIGS. 4 to 7, in the present embodiment, the coil 50*b* is disposed above the first electrode 30 such that the entire coil 50*b* overlaps the first electrode 30 when viewed along the Z direction. That is, the coil 50*b* is covered with the first electrode 30 when projected onto an XY plane perpendicular to the Z direction. More specifically, in the present embodiment, the first electrode 30 has an oval shape having a dimension larger than that of the coil 50*b* in the X direction and the Y direction, and the coil 50*b* is disposed inside an outline of the first electrode 30.

In the present embodiment, as shown in FIG. 6, one end 51*b* of the coil 50*b* is disposed at a position closer to the first electrode 30 than a central position Pc that is a central position of the coil 50*b* in the Z direction. That is, the linear distance d3 between the one end 51*b* and the first electrode 30 is smaller than a linear distance d5 between the first electrode 30 and the central position Pc. More specifically, the one end 51*b* is disposed at a lower end portion of the coil 50*b*, that is, at a position of the coil 50*b* closest to the first electrode 30. As shown in FIGS. 5 to 7, a first electric wire 75*b* according to the present embodiment is disposed in a +X direction of the coil 50*b*. A first coupling portion 76*b* extends in a −X direction from the first electric wire 75*b* toward the one end 51*b* of the coil 50*b*. A second electric wire 78*b* is disposed in the −X direction of the coil 50*b*. A second coupling portion 77*b* extends in the +X direction from the second electric wire 78*b* toward the other end 52*b* of the coil 50*b*.

Since the one end 51*b* is disposed at the position closer to the first electrode 30 than the central position Pc, it is possible to further prevent generation of an unnecessary electric field, which does not contribute to heating of the object OH to be heated, between the coil 50*b* and the first electrode 30 or between the first electric wire 75*b* or the first coupling portion 76*b* and the second electrode 40. Accordingly, it is possible to further increase an intensity of an electric field generated from the first electrode 30 and the second electrode 40. In particular, in the present embodiment, since the one end 51*b* is disposed at the lower end portion of the coil 50*b*, it is possible to further prevent the generation of the unnecessary electromagnetic field between the first electric wire 75*b* or the first coupling portion 76*b* and the second electrode 40.

According to the second embodiment described above, the coil 50*b* is covered with the first electrode 30 when projected onto the plane perpendicular to the Z direction. Accordingly, it is possible to prevent the generation of the unnecessary electromagnetic field, which does not contribute to the heating of the object OH to be heated, between the coil 50*b* and the second electrode 40. In particular, in the present embodiment, since the second electrode 40 surrounds a periphery of the first electrode 30 when viewed along the Z direction, for example, when there is a portion of the coil 50*b* that is not covered by the first electrode 30 when projected onto the plane perpendicular to the Z direction, the unnecessary electromagnetic field is easily generated between the portion and the second electrode 40. Therefore, by covering the coil 50*b* with the first electrode 30 when projected onto the plane perpendicular to the Z direction, it is possible to more effectively prevent the generation of the unnecessary electromagnetic field between the coil 50*b* and the second electrode 40.

C. Third Embodiment

Figure 8:
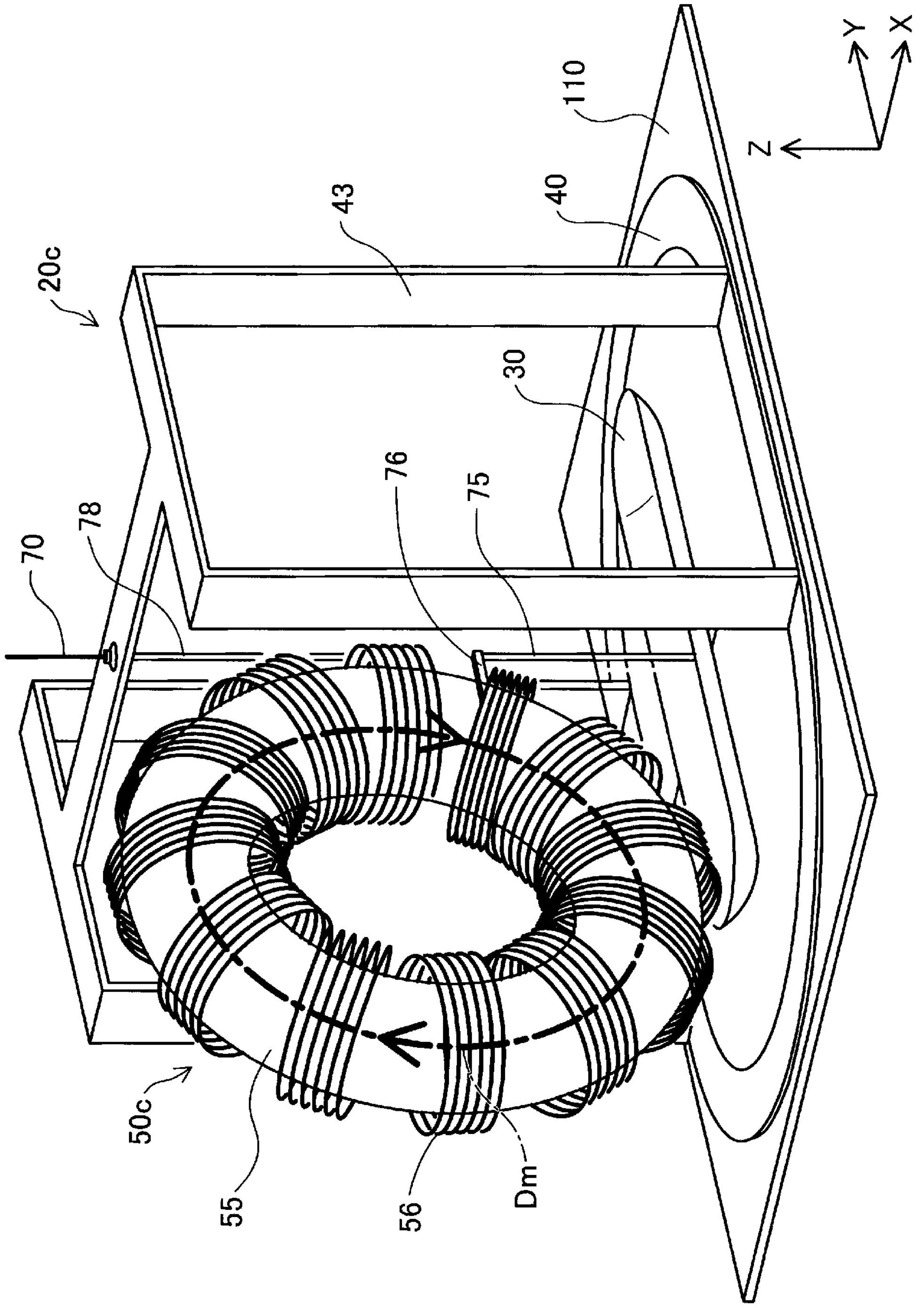
FIG. 8 is a perspective view showing a schematic configuration of an electrode unit according to a third embodiment.

FIG. 8 is a perspective view showing a schematic configuration of an electrode unit 20*c* according to a third embodiment. In FIG. 8, a part of the windings 56 is omitted as in FIGS. 2 and 3 described in the first embodiment. In the present embodiment, different from the first embodiment, a coil 50*c* includes a core 55. In configurations of the electrode unit 20*c* and the dielectric heating device 100 according to the third embodiment, portions not particularly described are the same as those according to the first embodiment.

The windings 56 of the coil 50*c* according to the present embodiment are wound around the core 55. The core 55 may be referred to as a winding core.

The core 55 according to the present embodiment is made of resin or ceramics. Accordingly, iron loss of the core 55 can be prevented, for example, compared to a case where the core 55 is an iron core made of carbon steel. Therefore, heat generation and power loss due to the iron loss of the core 55 can be prevented. In other embodiments, the core 55 may be an iron core, and in this case, an inductance of the coil 50*c* can be further increased as compared with a case where the core 55 is made of resin or ceramics.

Figure 9:
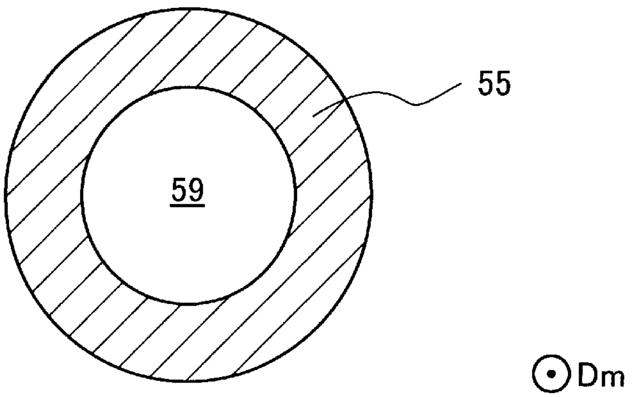
FIG. 9 is a diagram showing a cross section of a core orthogonal to a magnetic path direction.

FIG. 9 is a diagram showing a cross section of the core 55 orthogonal to the magnetic path direction Dm. As shown in FIG. 9, the core 55 according to the present embodiment has a hollow structure. More specifically, an annular hollow portion 59 is formed in the core 55 along the annular magnetic path direction Dm. That is, the core 55 has a pipe shape along the magnetic path direction Dm. Accordingly, the iron loss of the core 55 can be prevented. An effect of providing the hollow portion 59 in the core 55 is particularly large when the core 55 is an iron core. On the other hand, even when the core 55 is made of resin or ceramics, the core 55 may cause hysteresis loss or eddy current loss, and thus the iron loss of the core 55 can be prevented by providing the hollow portion 59 in the core 55.

According to the third embodiment described above, the coil 50*c* includes the core 55. Accordingly, the coil 50*c* can be easily formed.

In the present embodiment, the core 55 is made of resin or ceramics. Therefore, the iron loss of the core 55 can be prevented as compared with the case where the core 55 is the iron core.

In the present embodiment, the core 55 has the hollow portion 59 along the magnetic path direction Dm. Therefore, the iron loss of the core 55 can be prevented.

D. Other Embodiments (D-1) In the above embodiments, the linear distance d3 between the first electrode 30 and the one end 51 of the coil 50 is equal to or smaller than the linear distance d4 between the first electrode 30 and the central portion 53. Alternatively, the linear distance d3 may be larger than the linear distance d4.

(D-2) In the above embodiments, the coil 50 is formed in the annular shape such that the annular magnetic path is formed in the coil 50. Alternatively, the coil 50 may not be formed in the annular shape. For example, the entire coil 50 may be formed in a polygonal annular shape such that a polygonal annular magnetic path such as a rectangular annular magnetic path is formed in the coil 50. Similarly, the entire coil 50 may be formed in an oval or elliptical annular shape such that an oval or elliptical annular path is formed in the coil 50. When the coil 50 is formed in the annular shape, an end portion of the coil 50 on the one end 51 side and an end portion of the coil 50 on the other end 52 side may be spaced apart from each other by a dimension of approximately an average value of intervals between windings of the coil 50. In this case, the average value of the intervals between the windings of the coil 50 may be calculated, for example, by dividing an average magnetic path length of the coil 50 by the number of windings of the coil 50. The coil 50 may not be formed in the annular shape as long as the linear distance d1 is equal to or smaller than the linear distance d2. In this case, the end portion of the coil 50 on the one end 51 side and the end portion of the coil 50 on the other end 52 side preferably face each other. An angle difference between a direction Dm1 of a magnetic path on the one end 51 side of the coil 50 and a direction Dm2 of a magnetic path on the other end 52 side shown in FIG. 3 is preferably 10° or less. The end portion of the coil 50 on the one end 51 side is preferably disposed in the vicinity of the end portion of the coil 50 on the other end 52 side, and a smallest distance between the end portion of the coil 50 on the one end 51 side and the end portion of the coil 50 on the other end 52 side is more preferably equal to or smaller than one-tenth of the wavelength $\lambda_0$.

(D-3) In the above embodiments, the dielectric heating device 100 is provided with only the single electrode unit 20. Alternatively, two or more electrode units 20 may be provided in the dielectric heating device 100.

(D-4) In the above embodiments, the second electrode 40 surrounds the first electrode 30 when viewed along the Z direction. Alternatively, for example, the first electrode 30 may surround the second electrode 40 when viewed along the Z direction. The first electrode 30 and the second electrode 40 may be adjacent to each other when viewed along the Z direction, or may sandwich the object OH to be heated therebetween in the Z direction. Even in these cases, by disposing the coil 50 such that the coil 50 is covered with the first electrode 30 when projected onto a plane perpendicular to the Z direction as in the second embodiment, it is possible to prevent generation of an unnecessary electromagnetic field between the coil 50 and the second electrode 40. In this case, the first electrode 30 and the second electrode 40 may have any shape, such as a circular shape, an oval shape, a rectangular shape, or a polygonal shape. Areas of the first electrode 30 and the second electrode 40 may be the same as or different from each other when viewed along the Z direction. The first electrode 30 and the second electrode 40 preferably does not overlap each other when viewed along the Z direction.

(D-5) In the above embodiments, the electrode unit 20 may be capable of reciprocating in a direction intersecting a direction in which the object OH to be heated is conveyed. For example, the electrode unit 20 may be supported by a driving unit (not shown) implemented by a belt mechanism or a ball screw mechanism, and reciprocate in the X direction.

(D-6) In the above embodiments, a high-frequency voltage is applied to the electrode unit 20. Alternatively, a frequency of an AC voltage applied to the electrode unit 20 may not be high as long as it is a frequency capable of heating the object OH to be heated. The frequency of the AC voltage in this case is preferably 100 kHz or more and less than 1 MHz, for example.

E. Other Aspects

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features of the above embodiments corresponding to technical features of the following aspects can be replaced or combined as appropriate. The technical features can be deleted as appropriate unless described as essential in the present specification.

(1) According to an aspect of the present disclosure, a dielectric heating device is provided. The dielectric heating device includes a first electrode and a second electrode that face an object to be heated and to which an AC voltage is applied, and a coil that is electrically coupled in series to the first electrode. A linear distance between one end and the other end of the coil is equal to or smaller than a linear distance between the one end and a central portion of the coil in a magnetic path direction of the coil.

According to this aspect, when the AC voltage is applied, an electromagnetic field radiated from one end side of the coil is easily guided to the other end side of the coil, and an electromagnetic field radiated from the other end side of the coil is easily guided to the one end side of the coil. Therefore, even when the coil is increased in size due to an increase in the number of windings or a cross-sectional area of the coil, an unnecessary electromagnetic field generated from the coil can be prevented. Therefore, since it is not necessary to reduce an output of electric power output to the first electrode and the second electrode in order to prevent the unnecessary electromagnetic field generated from the coil, it is possible to prevent a decrease in heating efficiency of the object to be heated.

(2) In the above aspect, the coil may be formed in an annular shape such that an annular magnetic path is formed in the coil. According to this aspect, it is possible to more effectively prevent the unnecessary electromagnetic field generated from the coil.

(3) In the above aspect, the coil may be covered with the first electrode when projected onto a plane perpendicular to a direction in which the object to be heated and the first electrode face each other. According to this aspect, it is possible to prevent generation of the unnecessary electromagnetic field, which does not contribute to heating of the object to be heated, between the coil and the second electrode.

(4) In the above aspect, a linear distance between the first electrode and the one end may be equal to or smaller than a linear distance between the first electrode and the central portion. According to this aspect, a distance between the one end of the coil and the first electrode is smaller than that when the linear distance between the first electrode and the one end of the coil is larger than the linear distance between the first electrode and the central portion. Therefore, it is possible to prevent the generation of the unnecessary electromagnetic field, which does not contribute to the heating of the object to be heated, between the first electrode and the coil.

(5) In the above aspect, the coil may include a core. According to this aspect, the coil can be easily formed.

(6) In the above aspect, the core may be made of resin or ceramics. According to this aspect, iron loss of the core can be prevented as compared with a case where the core is an iron core.

(7) In the above aspect, the core may have a hollow portion along the magnetic path direction. According to this aspect, the iron loss of the core can be prevented.

What is claimed is:

1. A dielectric heating device comprising:

a first electrode and a second electrode that face an object to be heated and to which an AC voltage is applied; and a coil that is electrically coupled in series to the first electrode, wherein a linear distance between one end and another end of the coil is equal to or smaller than a linear distance between the one end and a central portion of the coil in a magnetic path direction of the coil, the first electrode is in an oval shape and extends along a first direction in a plan view, and a bottom of the first electrode has a curved convex surface, and the second electrode is in an oval-ring shape and surrounds the first electrode in the plan view.

2. The dielectric heating device according to claim 1, wherein the coil is formed in an annular shape such that an annular magnetic path is formed in the coil.

3. The dielectric heating device according to claim 1, wherein the coil is covered with the first electrode when projected onto a plane perpendicular to a direction in which the object to be heated and the first electrode face each other.

4. The dielectric heating device according to claim 1, wherein a linear distance between the first electrode and the one end of the coil is equal to or smaller than a linear distance between the first electrode and the central portion of the coil.

5. The dielectric heating device according to claim 1, wherein the coil includes a core.

6. The dielectric heating device according to claim 5, wherein the core is made of resin or ceramics.

7. The dielectric heating device according to claim 5, wherein the core has a hollow portion along the magnetic path direction.

* * * * *